Figure 1:
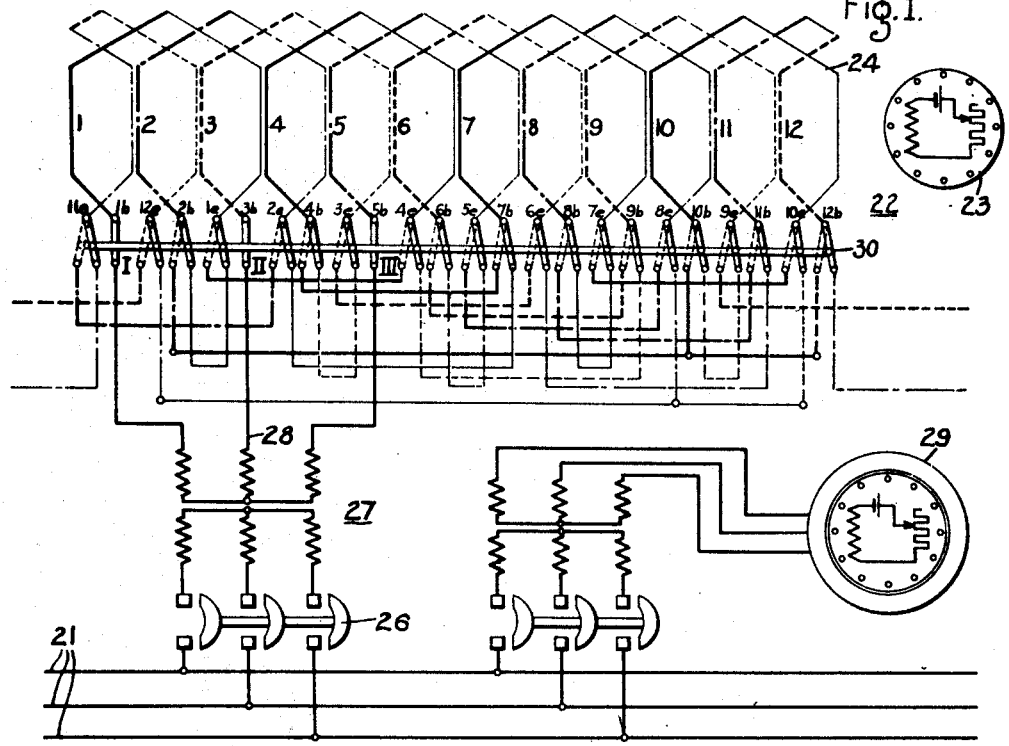

Oct. 2, 1928.

M. W. SMITH 1,685,963

ALTERNATING CURRENT TRANSMISSION SYSTEM

Filed April 29, 1924  3 Sheets-Sheet 1

1680 Amps. leading wattless.
No load saturation curves.
1470 Amps. lagging wattless.

WITNESSES:
R. J. Butler.
S. M. Pineles

INVENTOR
Marvin W. Smith.
BY
Wesley G. Carr
ATTORNEY

Oct. 2, 1928.  
M. W. SMITH  
1,685,963  
ALTERNATING CURRENT TRANSMISSION SYSTEM  
Filed April 29, 1924   3 Sheets-Sheet 2

WITNESSES:
R. J. Butler.
S. M. Pineles

INVENTOR
Marvin W. Smith.
BY
ATTORNEY

Oct. 2, 1928.

M. W. SMITH 1,685,963

ALTERNATING CURRENT TRANSMISSION SYSTEM

Filed April 29, 1924  3 Sheets-Sheet 3

WITNESSES:
R. J. Butler.
S. M. Pineles

INVENTOR
Marvin W. Smith.
BY
Wesley G. Carr
ATTORNEY

Patented Oct. 2, 1928.

1,685,963

UNITED STATES PATENT OFFICE.

MARVIN W. SMITH, OF WILKINSBURG, PENNSYLVANIA, ASSIGNOR TO WESTINGHOUSE ELECTRIC & MANUFACTURING COMPANY, A CORPORATION OF PENNSYLVANIA.

ALTERNATING-CURRENT TRANSMISSION SYSTEM.

Application filed April 29, 1924. Serial No. 709,848.

My invention relates to alternating-current transmission systems and it has particular relation to systems where synchronous dynamo-electric machines, connected to an alternating-current line, carrying currents which have, at times, a magnetizing effect, and at other times, a demagnetizing effect on the field members of the machines.

Generators supplying electrical power-transmission systems are, in general, designed with a view to developing a maximum generating capacity when the system is fully loaded, the generator carrying, under such conditions, a lagging current. In modern high-voltage systems requiring leading current under light loads, difficulty is encountered on account of the generators becoming unstable in operation when carrying leading currents producing a magnetizing armature reaction and requiring a reduction, or even a reversal, of the excitation for generating the normal voltage. Turbo-alternators, having no salient poles, are particularly subject to instability at low field excitations.

To increase the stability of synchronous machines operating within a range where the armature current has a magnetizing effect, it is necessary to increase the field excitation and to decrease the magnetizing effect of the armature current, i. e., it is necessary to increase the ratio between the field current and the armature reaction. In other words, the design of the machine must be such that the effect of the magnetizing current of the armature on the field will be minimized.

Heretofore, the necessary stability during low leading power-factor operation has been secured either by making a larger air gap or by employing a smaller number of ampere turns on the armature, or by a combination of both methods. Such changes necessitate, however, additional field excitation or larger and longer rotors for generating the full required power under full load when the lagging current produces a demagnetizing armature reaction. As a result, larger and more costly machines are required for the same real loads.

In accordance with my invention, I so change the armature connections as to produce a lower terminal voltage during the under-excited operation of the machine. A convenient plan for applying my invention to the operation of a high-voltage transmission system is to connect some or all of the synchronous machines with an interconnected-star-winding connection, thus increasing the field excitation and stability, when the transmission line is lightly loaded, and to connect the machines with a star-winding connection, thus avoiding excessive field excitation and overheating when the transmission line is more heavily loaded.

One object of my invention is, therefore, to provide a machine capable of delivering the full rated current while maintaining stable operation, whether the current in the machine is magnetizing or demagnetizing.

Another object of my invention is to provide a dynamo-electric machine comprising means for varying the ratio between the field excitation and the armature reaction in accordance with the operating conditions.

A still further object of my invention is to provide a machine of the above designated character having a winding adapted to give different armature reactions, depending on the connections of the elements of the winding and producing balanced voltage conditions and a balanced field distribution under all conditions of operation.

A further object of my invention is to provide a new method of operating an alternating-current transmission system for securing a maximum output of the machine operating on the system, independently of the character of the current flowing through the system.

An additional object of my invention is to provide a new or "special" interconnected-star-armature-winding connection for avoiding losses inherent in such machines as heretofore made.

Figure 2:
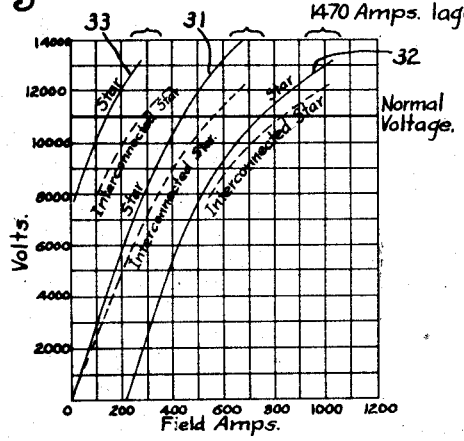
Figure 3:
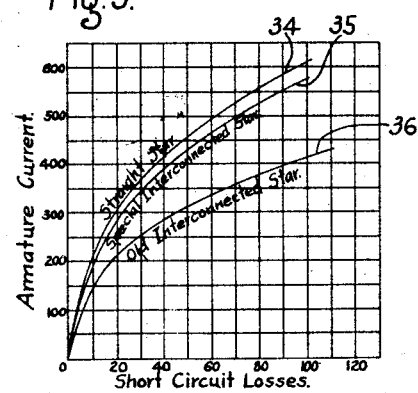
Figure 6:
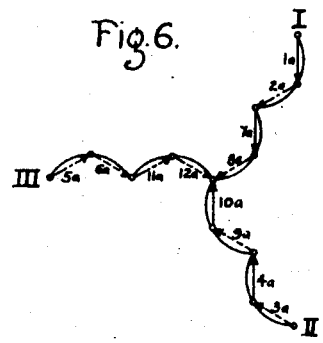
Figure 7:
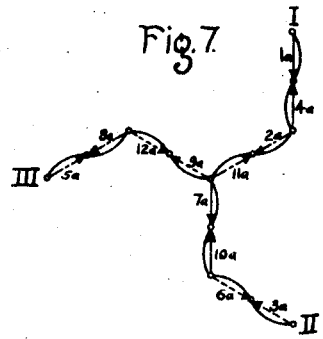
Figure 8:
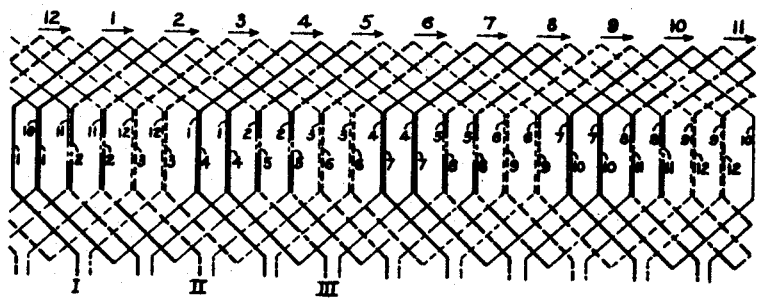

With the foregoing and other objects in view, my invention comprises the combinations, details of construction and methods of operation described and claimed hereinafter and illustrated in the accompanying drawing, wherein Figure 1 is a diagrammatic view showing an alternating-current transmission system embodying my invention, and also showing a special dynamo-electric machine designed for said system, Fig. 2 is a diagrammatic view showing the saturation curves of a synchronous machine operating in the power-transmission system shown in Fig. 1, Fig. 3 is a diagrammatic view showing the losses in machines utilized in a system shown in Fig. 1, Figs. 4, 5, 6 and 7 are diagrammatic views illustrating the different connections of the winding utilized in the special machine shown in Fig. 1, Fig. 8 is a plan view of a developed winding utilized in the special machine shown in Fig. 1, and Figs. 9 to 14 are curves showing the magnitude of the magnetomotive force of the currents flowing in the winding shown in Fig. 8 under different operating conditions, described more fully hereinafter.

Referring to Fig. 1, a three-phase transmission line 21 has connected thereto a synchronous dynamo-electric machine, such as a three-phase generator 22, comprising a direct-current field or rotor member 23 and a stator member carrying an armature winding 24. The winding 24 is designed, in the present case, for four-pole operation and comprises twelve coil groups 1 to 12, disposed uniformly along the periphery of the armature as a two-layer, lap winding. The upper coil sides are indicated by heavy lines and the lower coil sides are indicated by light lines.

The connection between the armature winding 24 and the transmission line 21 may be effected by means of a circuit breaker 26 and a step-up transformer 27 having three leads 28 connected to three phase-terminals I, II and III of the winding 24. The twelve coil groups of the winding are connected to twenty-four switches, 1b, 1e to 12b, 12e, leading from the beginnings and ends of the coil groups, respectively. All the switches except the switches 1b, 3b and 5b that are permanently connected to the three phase-terminals I, II and III, are actuated by a common arm 30 and may be brought into the left-hand position, as shown in dotted lines, whereby the coil groups are connected in star to provide a maximum voltage when operating with demagnetizing current, or into the right-hand position, as shown in full lines, whereby the coil groups are connected in interconnected star for operation with magnetizing current.

The transmission line may also be connected to other synchronous machines such as a synchronous condenser 29.

Interconnected star windings, such as the winding shown diagrammatically in Fig. 7, have been known and used for a long time, but, apparently, the designers have never had a short-circuit-loss test on a machine with this type of winding. Some idea of the difficulty of analyzing the losses in the machine may be had when it is stated that some of the generator tests described herein were on substantially the largest units ever to receive a complete factory test.

With the ordinary interconnected star connection shown in Fig. 7, the test showed that the load loss, instead of being 50% to 75% of the $I^2R$ loss, as is usually the case in machines on the same frame but having the star or delta connection, was more than twice the $I^2R$ loss. On further investigation, it was found, by plotting the armature reaction, that, although the voltage was balanced, the armature reaction from one pole to the next was considerably unbalanced and irregular. This unbalanced armature reaction has harmonic components which react on the damper winding and pole faces, causing high additional losses. It was further found that, by special connection of the armature winding, the interconnected feature may be retained, producing a terminal voltage 0.866 times that obtained with star connection, and the unbalanced armature reaction, with its incident increased load loss, may be substantially avoided.

My calculations and special winding connections have been thoroughly coroborated by tests and will be set forth more in detail in the following description.

The novel results obtained through the provision of the two connections which are effected by means of the switch-arm 30 will be better understood by considering the diagrams shown in Figs. 4, 5, 6 and 7, illustrating the relative phase relations of the voltages induced in the several coil groups 1 to 12 and the connections with which the coil groups are operated.

Figure 4:
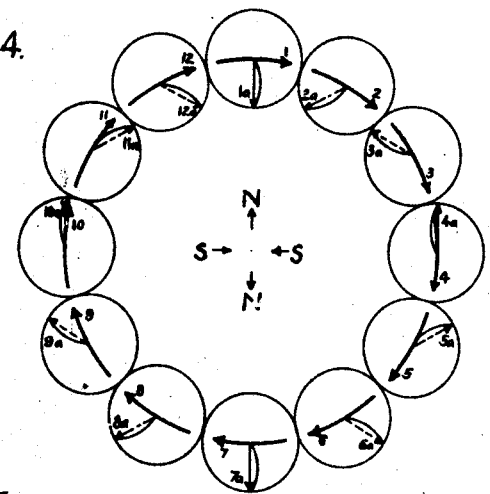

In Fig. 4, the twelve winding groups 1 to 12 are shown in the form of arrows 1 to 12 uniformly distributed along the periphery of a circle. Four arrows "N" and "S" indicate the directions of the poles with which the winding is operated. The magnitudes and phases of the voltages induced in the several winding groups are indicated by vectors 1a to 12a. Thus, the vector 1a indicates the phase of the voltage induced in the coil group 1. The voltage induced in the coil group 4, which is 180° out of phase with the coil group 1, is indicated by the vector 4a which is 180° out of phase with the vector 1a. The voltages induced in the coil groups 2 and 3, which are 60° and 120° out of phase with the coil group 1, are indicated by the vectors 2a and 3a which are 60° and 120° out of phase with the vector 1a, and so on.

When the current through the machine is demagnetizing, I provide such connections between the different winding groups as to produce the necessary voltage with a minimum of excitation since the amount of excitation necessary with a given number of coil groups directly determines the dimensions of the rotor and indirectly determines the dimensions of the machine.

I so connect the winding, therefore, as to obtain the maximum output voltage when the armature reaction is demagnetizing.

With a two-layer winding, such as is best adapted for use in machines of the above designated character, the maximum output voltage is obtained by dividing the coils corresponding to each pole-pair into twice as many coil groups as the number of phases and connecting the respective coil groups which are separated by a full pole-pitch into the respective phases of the winding. This connection, which I shall designate as the "straight star connection", corresponds to the left-hand position of the switch-arm 30, Fig. 1, and is shown diagrammatically in Fig. 5.

Since the voltage induced in the coil groups 1, 7 and 4, 10 are of the same or of opposite phases, I connect the same in proper direction in phase I of the winding. Coil-groups 3, 6, 9 and 12 and coil-groups 5, 8, 11, and 2 are similarly connected in phases II and III, respectively. The vectors corresponding to the coils in the three phases I, II and III are indicated, respectively, by full lines, dash lines and dot and dash lines.

For securing stable operation with magnetizing armature reaction, I effect a marked increase in the ratio between the field ampere-turns and the armature-reaction ampere-turns by so connecting the armature winding as to require a larger field excitation for generating the same voltage, and producing a reduced armature magnetomotive force. To this end, I connect the coil groups 1 to 12 as an interconnected star winding shown in Fig. 6, corresponding to the right-hand position of the switch-arm 30, or, as shown in Fig. 7, both connections giving a reduced voltage as well as a reduced armature reaction.

Figure 5:
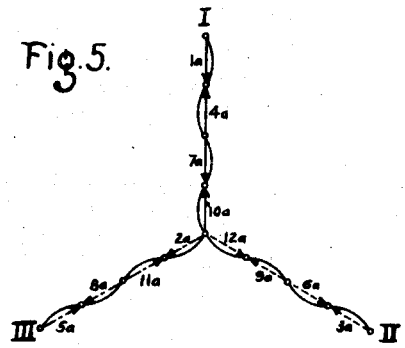

With the connections shown in Fig. 6 or Fig. 7, the voltages induced in the coil groups of the same phase add geometrically, and the resultant voltage is smaller than the algebraic sum of the voltages obtained with the connections shown in Fig. 5.

By operating the machine with the "straight star connection" when the armature reaction is demagnetizing and with the interconnected star connection when the armature reaction is magnetizing, I utilize the full capacity of the machine when operating with demagnetizing armature currents, and, at the same time, I provide maximum stability by increasing the ratio of the field excitation to the armature reaction when the currents through the armature are magnetizing.

The enlarged range of operation which is obtained by using my invention is well demonstrated in Fig. 2 showing the characteristic curves of a 28,000 KVA, 11,000 volt, synchronous waterwheel generator under different conditions of operation. Curve 31 is the saturation curve under no-load conditions with the star connection. Curve 32 is the corresponding saturation curve with the armature carrying 1470 amperes lagging 90° behind the voltage. To produce the rated terminal voltage of 11,000 volts with a lagging armature current, more excitation current is necessary than in case of no load, partially to offset the demagnetizing effect of the armature reaction and partially to induce an electromotive force for overcoming the internal impedance of the machine.

Curve 33 is the corresponding saturation curve when the armature carries 1680 amperes leading by 90° the voltage of the machine. The leading current produces a magnetizing armature reaction and only 140 amperes field current are necessary to induce the required terminal voltage, as against 450 amperes under no-load conditions. The three curves for the interconnected star connection are shown in dotted lines, from which it will be seen that the excitation, when supplying 1680 amperes zero power-factor current leading, is increased from 140 amperes to 270 amperes. The increased stability during under-excited operation is thus clearly shown. Another advantage of the operation with the interstar connection, which clearly appears from these curves, is that, upon the load suddenly dropping off from the line, the ultimate voltage to which the generator will build up will be considerably less, on account of the lower voltage at which the machine becomes saturated.

Assuming a system where several generators are adapted to operate on a transmission line, each generator being able to supply leading current during certain periods of operation and to supply lagging current for charging the line during other periods of operation; instead of increasing the sizes of the machines to make them able to generate the required currents within a wide range of power factors, I bring out the leads of the several winding groups of the armature to a switching mechanism and operate one or more of the machines with the interconnected star connection during the period of light-load operation. After the load is built up to some suitable value, below the limit of the capacity of this one machine, one or more other machines may be connected to the line and operated to take over the load while the first machine is disconnected and changed to the straight star connection. The machine, after reconnection, may then be operated to take over some of the load on the line, if desired.

The same expedient may be used when a machine is designed for a system which is to carry, at some future time, a large load but during the initial period of operation is always lightly loaded and the current generated in the machine is of leading power factor. To utilize the full capacity of the machine and secure a maximum stability, I connect the machine in interconnected star during the initial period of operation when the generated current is leading and I reconnect the same for "straight star" operation when the load on the line has built up to its normal value. Since the machine units employed in such systems represent a very large capital investment, a substantial decrease in the size of the machine, as effected according to my invention, is of large economical importance as it reduces the initial investments necessary to construct a power-transmission system and thus promotes the development of the same.

While the interconnected star windings of the type shown in Fig. 7 are not new in the design of dynamo-electric machines, the winding and the connections which I employ are different from those known at present and it is my desire that the novel features of the same be regarded as a distinct element of my invention, as well as the general application of the interconnected-star type of winding to long high-voltage transmission lines having excessive charging currents.

The ordinary practice of providing an interconnected star winding, that is, a winding which gives a reduced voltage across the terminals of the same, is to open the three phases of the winding connection shown in Fig. 5 at the midpoint of each phase group and to connect each half of one phase group with a half of another phase group as shown in Fig. 7, wherein the coil groups 1a, 4a of phase I of the straight star connection, Fig. 5, are connected in series to the coil groups 2a and 11a of the phase III of the straight star connection, and so on. I have found that, while the interconnected-star connection shown in Fig. 7, which is generally used, presents certain advantages by reason of the small number of external connections, it represents certain very definite disadvantages when used in connection with my invention, since it gives unduly large losses in the machine and reduces the efficiency of the same, as will be explained hereinafter.

According to my invention, I make the inter-connected star connection or, as I term it, the "special iterconnected star", by so grouping the coils of the armature that the coils corresponding to each pole pair are divided into three consecutive coil groups, corresponding to the number of phases, and the coil groups which are thus obtained are then grouped into the several phases of the machine. Thus, in Fig. 6, I connect in phase I the two adjacent coil groups 1a, 2a, corresponding to the first phase of one pole pair, to the two adjacent coil groups 7a, 8a, corresponding to the first phase of the second pole pair, in phase II I connect coil groups 3a, 4a, constituting the second phase of one pole pair, to coil groups 9a, 10a, constituting the second phase of the other pole pair; in phase III I connect coil groups 5a, 6a, constituting the third phase of one pole pair, to coil groups 11a, 12a, constituting the third phase of the second pole pair.

While my improved interconnected-star connection shown in Fig. 6 gives the same result as that in Fig. 7, as far as the generated voltage is concerned, it behaves radically different from the winding connection shown in Fig. 7 with respect to the magnetomotive forces of the current flowing in the two windings and in the distribution of the field induced by the armature current. I have found that the excessive losses found in the machines utilizing the old form of interconnected-star connection as shown in Fig. 7 result from nonuniform distribution of the field generated by the magnetomotive forces of the currents flowing in the winding. Currents flowing in a winding connected in accordance with Fig. 6 produce a symmetrical field in the same manner as the straight star connection which is ordinarily used in dynamo-electric machines.

The superiority of the winding-connections made according to my invention is clearly demonstrated in the diagrams, Figs. 8 to 14, illustrating the magnitudes of the magnetomotive forces induced by currents flowing in a 4-pole winding, and the resulting distribution of the field for the various winding connections and under different conditions of operation.

The winding shown in Fig. 8 is of the same character as that shown in Fig. 1 except that each of the coil groups 1 to 12, is shown comprising two coils having a pitch equal to the pole pitch. The coil sides which the disposed in the same slot are shown adjacent to each other, the heavy lines indicating the upper coil side, the light lines indicating the lower coil side.

Figure 9:
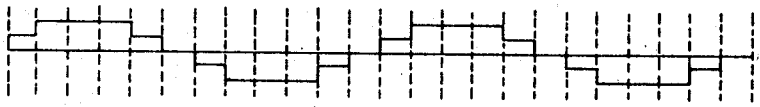
Figure 10:
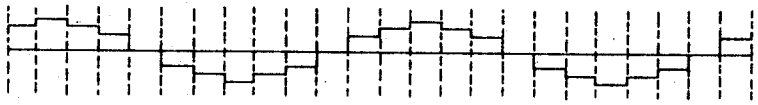

Figs. 9 and 10 represent the curves of the magnetomotive forces induced in the winding shown in Fig. 8 with the straight star connection of Fig. 5 at two different moments of operation. Fig. 9 corresponds to the moment when a current of 0.866 of the maximum value enters through phase II and leaves through phase I while phase III is without current. Fig. 10 represents the instant when the current in phase II has its maximum value and divides itself into two equal halves flowing through phases I and III.

Figure 11:
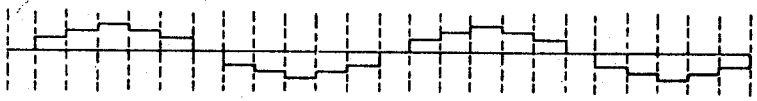
Figure 12:
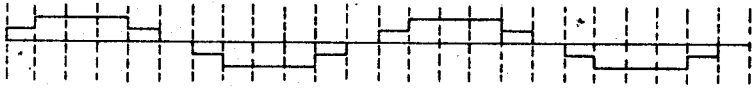
Figure 13:
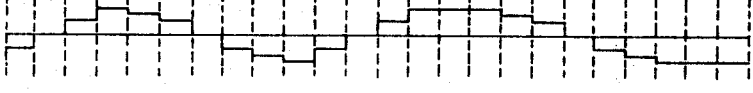
Figure 14:
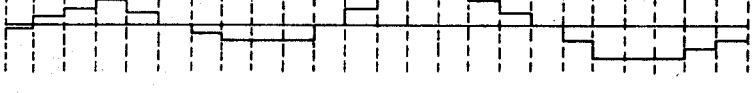

Figs. 11 and 12 represent the magnetomotive forces under the same two different conditions of operation as those of Figs. 9 and 10, but with the special interconnected star connection shown in Fig. 6. Figs. 13 and 14 show the curves of the magnetomotive forces for the same two current conditions when the winding is connected according to the old interconnected star connection shown in Fig. 7. By comparing the diagrams of the magnetomotive forces produced by currents flowing in the winding when connected according to the different diagrams shown in Figs. 5, 6 and 7, it may be seen that while the curves obtained for the "straight star" and the "special interconnected star" connection are perfectly symmetrical and substantially sinusoidal, the curves of the magnetomotive forces for the old interconnected star connection is unsymmetrical. The latter connection gives an unevenly distributed field which is the cause of the excessive losses.

The great improvement obtained by the use of the special interconnected star connection over the old interconnected star connection may be realized by considering the diagram shown in Fig. 3, wherein curve 34 shows the short-circuit losses as a function of the generated energy for operation with the straight star connection. Curve 35 is a similar curve when operating with the "special interconnected star" and curve 36 is a curve when operating with the "old interconnected star." It is readily seen that the old "interconnected star" winding causes a very material loss and unnecessary heating of the machine which is very effectively eliminated by using the "special interconnected star" winding which, on the other hand, gives all the other advantages of the interconnected-star connection necessary for the successful operation of my machine.

Certain features of the invention constituting the subject matter of the present application have been described in my paper entitled "Waterwheel generators and synchronous condensers for long transmission lines", published in the A. I. E. E. Journal for September 1923, page 892.

My invention is intended chiefly for use in connection with generators employed on long transmission lines for supplying power thereto as well as in connection with synchronous condensers connected to such lines for correcting the power factor of the same and which have to operate at times with leading and at times with lagging currents. However, I do not wish that my invention be limited to such uses only or to the particular apparatus, combinations and methods described herein, but I desire that the appended claims shall be awarded the widest interpretation consistent with the prior art.

I claim as my invention:

1. The combination with an alternating-current line, a dynamo-electric machine connected to said line and exciting means for said machine, said line being of such length and voltage that the line-charging current tends to additionally magnetize said machine and produce an excessive voltage rise, of means for, at times, decreasing the relative magnetizing effect of the armature current as compared to the magnetizing effect of the current in said exciting means and, at other times, increasing said relative magnetizing effect.

2. The combination with an alternating-current line, a constant-voltage dynamo-electric machine having an armature connected to said line and a field member and exciting means for said field member, the line current flowing in said armature being, at times, magnetizing and, at other times, demagnetizing, and means for so changing the characteristics of said machine as to vary the relative magnetic effects of the armature current and the field member current for currents of the same values.

3. The combination with an alternating-current transmission line and a separately excited dynamo-electric machine operating thereon, said line being of such length and voltage that the line charging current tends to produce an excessive rise in the terminal voltage of said machine during light-load operation, of means for changing the armature connections to produce the effect of a smaller number of ampere-turns in the armature during light-load operation.

4. The combination with a long, high-voltage alternating-current transmission line and a dynamo-electric machine connected thereto, the characteristics of said machine and line being such that the line-charging current flowing in said machine tends to produce an excessive rise in voltage during light-load operation, of means for changing the armature connections to change the effective voltage range of the machine for any condition of field excitation.

5. The combination with an alternating-current transmission line of such length and voltage that the line charging current tends to produce an excessive rise in voltage during light-load operation, of a synchronous dynamo-electric machine operating on said line and means for changing the armature connections to change the effective voltage of the machine for any given condition of field excitation and load.

6. The combination with an alternating-current line, a constant voltage dynamo-electric machine having an armature connected to said line and a field member, and exciting means for said field member, said line being of such length and voltage that the line-charging current tends to additionally magnetize said machine and produce an excessive voltage rise, of means for at times decreasing the relative magnetizing effect of the armature current on the air-gap flux as compared to the magnetizing effect of the current in said field member and, at other times, increasing said relative magnetic effect, said field member being so designed that substantially the entire flux produced therein is forced into the air gap between are armature and field member.

7. In a polyphase machine having $p$ pole pairs, $p$ being an integer greater than one, an $n$-phase two-layer winding, the coils of the winding being divided into $2\,np$ consecutive coil-subgroups, means for connecting said sub-groups into $n$ phase-groups, each phase-group containing $2\,p$ coil-subgroups of the same phase, and means for effecting an interconnected-star connection of the coil subgroups of different phases for every consecutive pair of poles.

8. In a polyphase machine having $p$ pole pairs, $p$ being an integer greater than one, an armature having an $n$-phase winding, the coils of the winding being divided into $2\,np$ consecutive coil-subgroups, means for connecting said sub-groups into $n$ phase-groups, each phase-group containing $2\,p$ coil-subgroups of the same phase and means for reconnecting coil-subgroups of different phases into a balanced phase winding, the coil subgroups of the different phases being distributed around the armature and symmetrically distributed around each pole of the machine.

9. In a polyphase machine having $p$ pole pairs, $p$ being an integer greater than one, an $n$-phase winding, the coils of the winding being divided into $2\,np$ consecutively disposed coil-subgroups, means for at times connecting the coil-subgroups having induced therein voltages of the same phase into $n$ phase-groups, each phase-group containing $2\,p$ coil-subgroups, the distance between successive coil-subgroups in each phase-group being substantially equal to the pole pitch, and means for at other times connecting adjacent pairs of coil-subgroups to constitute $np$ pairs of serially connected coil-subgroups and for connecting corresponding phases of said latter pairs of subgroups into $n$ phase-groups.

10. The method of operating a system comprising an alternating current line and a synchronous dynamo-electric machine connected to said line, whereby the range of stable operation of the machine is enlarged, which comprises operating said machine with connections giving a relatively high induced armature voltage for any value of the field excitation when the current through the armature acts remagnetizing and operating said machine with connections giving a relatively low armature reaction at certain times when the current through the armature acts magnetizing.

11. The method of operating a system comprising an $n$-phase, alternating-current line and a synchronous dynamo-electric machine having an armature winding connected to said line and a direct-current excited field member having $p$ pole pairs, $n$ and $p$ being greater than one, said armature winding being divided into $2\,np$ consecutive coil-subgroups, which comprises connecting the coil-subgroups which are separated by substantially a full pole pitch into $n$ phase groups to give a relatively high induced voltage when the armature reaction is strongly demagnetizing, and at other times connecting adjacent pairs of coil-subgroups to constitute $np$ pairs of consecutive coil-subgroups and connecting said pairs of subgroups into $n$ phase groups.

12. In a polyphase machine having $p$ pole pairs, $p$ being an integer greater than one, an $n$-phase two-layer winding, the coils of the winding being divided into $2\,np$ consecutively disposed coil-subgroups, means for at times connecting the coil-subgroups having induced therein voltages of the same phase into $n$ phase-groups, each phase-group containing $2\,p$ coil-subgroups, the distance between successive coil-subgroups in each phase-group being substantially equal to the pole pitch, and means for at other times connecting adjacent pairs of coil-subgroups to constitute $np$ pairs of serially connected coil-subgroups and for connecting said latter pairs of subgroups into $n$-phase groups.

13. In a polyphase machine having $p$ pole pairs, $p$ being an integer greater than one, an $n$ phase two-layer winding, the coils of the winding being divided into $2\,np$ consecutive coil-subgroups, means for connecting adjacent pairs of coil-subgroups to constitute $np$ pairs of serially connected coil-subgroups and for connecting corresponding phases of said latter pairs of subgroups into $n$ phase-groups.

14. In a polyphase machine having $p$ pole pairs, $p$ being an integer greater than one, an armature having an $n$-phase two-layer winding, the coils of the winding being divided into $2\,np$ consecutive coil-subgroups, means for connecting said subgroups into $n$ phase-groups, each phase-group containing $2\,p$ coil-subgroups of the same phase, and means for interconnecting coil-subgroups of different phases into a balanced phase winding, the coil subgroups in the different phases being distributed around the armature and symmetrically distributed around each pole of the machine.

15. The method of securing either one of two voltage connections from a single style of polyphase machine having $p$ pole pairs, $p$ being an integer greater than one, and an $n$-phase winding comprising $2\,np$ consecutively disposed coil-subgroups having two terminal leads apiece, which consists in connecting the coil-subgroups having induced therein voltages of the same phase into $n$ phase-groups for one voltage connection, each phase-group containing $2\,p$ coil-subgroups and the distance between successive coil-subgroups in each phase-group being substantially equal to the pole pitch, and connecting adjacent pairs of coil-subgroups to constitute $np$ pairs of serially connected coil-subgroups and connecting said latter pairs of subgroups into $n$ phase groups for the other voltage connection.

16. In a dynamo-electric machine having $p$ pole pairs, a magnetic core having an $n$-phase winding, $p$ and $n$ being integers greater than one, said winding comprising a plurality of uniformly distributed coils, the coils on the periphery of the core being divided into $p$ consecutive pole groups corresponding to the number of pole pairs of the machine, each pole group comprising $2n$ consecutive phase subgroups, means for, at times, so interconnecting said coil-subgroups that each phase of the winding comprises similarly disposed coils of the same phase in each of the pole groups, and means for, at other times, so interconnecting said coil-subgroups that each phase of the winding comprises coils of different phases in each of the consecutive pairs of adjacent pole groups.

17. The method of operating a long, high-voltage alternating-current line of substantially constant voltage at a terminal thereof, in combination with a dynamo-electric machine having an armature winding connected to said line at said terminal and also having a field-magnet member excited by direct current, the current in said armature winding having a magnetizing or demagnetizing reaction depending on its phase with respect to the voltage, which consists in so connecting the armature winding as to generate the maximum possible voltage when the armature reaction is demagnetizing and in changing the armature-winding connections in such manner as to reduce the armature reaction and require a larger excitation on the field member to produce the required voltage when the armature reaction is magnetizing.

In testimony whereof, I have hereunto subscribed my name, this 25th day of April, 1924.

MARVIN W. SMITH.